United States Patent
Tench et al.

(10) Patent No.: US 6,552,843 B1
(45) Date of Patent: Apr. 22, 2003

(54) REVERSIBLE ELECTRODEPOSITION DEVICE WITH IONIC LIQUID ELECTROLYTE

(75) Inventors: D. Morgan Tench, Camarillo, CA (US); Leslie F. Warren, Jr., Camarillo, CA (US)

(73) Assignee: Innovative Technology Licensing LLC, Thousand Oaks, CA (US)

( * ) Notice: Subject to any disclaimer, the term of this patent is extended or adjusted under 35 U.S.C. 154(b) by 0 days.

(21) Appl. No.: 10/066,210

(22) Filed: Jan. 31, 2002

(51) Int. Cl.[7] ............................. G02F 1/00; G02F 1/153
(52) U.S. Cl. ..................... 359/321; 359/267; 359/269; 359/271
(58) Field of Search ............................. 359/265, 266, 359/267, 268, 269, 270, 271, 272, 273, 274, 275, 321; 205/234; 204/290.07, 266; 428/323, 426; 252/583, 600

(56) References Cited

U.S. PATENT DOCUMENTS

| | | | | |
|---|---|---|---|---|
| 4,624,753 A | * | 11/1986 | McManis, III et al. | 205/234 |
| 4,624,754 A | * | 11/1986 | McManis, III et al. | 205/234 |
| 5,903,382 A | | 5/1999 | Tench et al. | |
| 5,923,456 A | | 7/1999 | Tench et al. | |
| 6,111,685 A | | 8/2000 | Tench et al. | |
| 6,166,847 A | | 12/2000 | Tench et al. | |
| 6,256,135 B1 | * | 7/2001 | Tench et al. | 359/271 |
| 6,301,039 B1 | * | 10/2001 | Tench | 359/267 |
| 6,400,491 B1 | * | 6/2002 | Tench et al. | 359/270 |

OTHER PUBLICATIONS

Ali, Nishikata and Tsuru, Electrochim. Acta 42, 1819 (1997).
Ali, Nishikata and Tsuru, Indian J. Chem. Technol. 6, 317 (1999).
Ali and Tsuru, Indian J. Chem. Technol. 8, 44 (2001).
Carlin, Crawford and Bersch, J. Electrochem. Soc. 139, 2720 (1992).
Chen, Lin and Sun, J. Electrochem. Soc. 147, 3350 (2000).
Hurley and Wier, J. Electrochem. Soc. 98, 203 (1951).
Hurley and Wier, J. Electrochem. Soc. 98, 207 (1951).
Katayama, Dan, Miura and Kishi, J. Electrochem. Soc. 148, C102 (2001).
Lee, Miller, Shi, Kalish and Wheeler, J. Electrochem. Soc. 148, C183 (2001).
Liao, Pitner, Stewart, Hussey and Stafford, J. Electrochem. Soc. 144, 936 (1997).
Mantell and Zaromb, J. Electrochem. Soc. 109, 992 (1962).
Tsuda, Nohira and Ito, Electrochim. Acta 46, 1891 (2001).
Zhu and Hussey, J. Electrochem. Soc. 148, C395 (2001).
Zhu, Hussey and Stafford, J. Electrochem. Soc. 148, C88 (2001).
Zielger and Howard., Solar Eng. Mater. Solar Cells 39, 317, (1995).

* cited by examiner

Primary Examiner—Loha Ben

(57) ABSTRACT

The present invention is a reversible electrodeposition optical modulation device employing an ionic liquid electrolyte, which is comprised of a mixture of an ionic organic compound and the salt of an electrodepositable metal. The solventless ionic liquid can contain very high concentrations of electrodepositable metal ions and provides the high current carrying capability needed for fast device switching. Switching uniformity is also significantly improved since the electrolyte resistance is at least an order of magnitude higher than that of typical solvent-based electrolytes. Fast switching and good cycle life for high quality mirror electrodeposits in reversible electrochemical mirror (REM) devices was demonstrated. Best results were obtained for novel silver halide electrolytes employing pyrrolidinium and N-methylpyrrolidinium cations.

11 Claims, 4 Drawing Sheets

1-Ethyl-3-methylimidazolium

N-Butylpyridinium

1-Ethylimidazolium

1-Methyl-2-pyrrolinium

Pyrrolidinium

N-Methylpyrrolidinium

N,N-Dimethylpyrrolidinium

N,N-Ethylmethylpyrrolidinium

N-$R_1$-3-$R_2$-pyrrolidinium

REVERSIBLE ELECTRODEPOSITION DEVICE WITH IONIC LIQUID ELECTROLYTE

CROSS-REFERENCE TO RELATED APPLICATIONS

This application is related to U.S. Pat. Nos. 5,903,382; 5,923,456; 6,111,685; 6,166,847; 6,256,135 and 6,301,039; and to U.S. patent application Ser. No. 09/619,127, filed Jul. 18, 2000, now U.S. Pat. No. 6,400,491.

BACKGROUND OF THE INVENTION

1. Field of the Invention

This invention is concerned with devices, such as adjustable mirrors, smart windows, optical attenuators and displays, for controlling the reflectance and/or transmission of electromagnetic radiation.

2. Description of the Related Art

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. Such approaches are only partially effective since the window itself is heated so that heat is transferred into the interior by convection. In addition, these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable, low-voltage smart window with variable reflectivity. Reflecting the light, rather than absorbing it, is the most efficient means for avoiding inside heating. Devices for effectively controlling transmission of light are also needed for a variety of other applications. For example, an effective means for controlling light transmission over a wide dynamic range is needed to permit use of inexpensive arc lamps as light sources for projection displays.

Bright light from headlamps on following vehicles reflected in automobile rear and side view mirrors is annoying to drivers and creates a safety hazard by impairing driver vision. Currently available automatically dimming mirrors rely on electrochromic reactions to produce electrolyte species that absorb light that would otherwise be reflected from a static mirror. Such devices do not provide close control over the amount of reflected light, and are expensive to fabricate since a very constant inter-electrode spacing (i.e., cell gap) is required to provide uniform dimming. Image sharpness is also reduced for electrochromic mirror devices since the reflected light must pass through the electrolyte (twice). There is an important need for an inexpensive adjustable mirror device that provides close control of reflected light with minimal image distortion.

Some earlier workers attempted to exploit reversible electrodeposition of a metal for light modulation, primarily for display applications [see for example, J. Mantell and S. Zaromb, J. Electrochem. Soc. 109, 992 (1962) and J. P. Ziegler and B. M. Howard., Solar Eng. Mater. Solar Cells 39, 317, (1995)]. In these cases, metal, typically silver or bismuth, was reversibly electrodeposited onto a transparent working electrode, usually indium tin oxide (ITO), from a thin layer of electrolyte sandwiched between the working electrode and a counter electrode. Both water and organic liquids (e.g., dimethylsulfoxide or dimethylformamide) were employed as solvents. The deposits obtained on the transparent electrode presented a rough and black, gray, or sometimes colored appearance (typical of finely-divided metals) and were used to enhance light absorption by display elements. Pigments were often added to the electrolyte to provide a white background for improved contrast. An auxiliary counter electrode reaction (e.g., halide ion oxidation) was typically employed so as to provide a voltage threshold (which is needed for matrix addressing) and/or to avoid metal deposition on a transmissive counter electrode (which would offset the light modulation provided by metal deposition on the working electrode). Such auxiliary reactions introduced chemistry-related instabilities during long term operation and led to deposit self erasure on open circuit via chemical dissolution of the metal deposit. Nonetheless, the key drawback of reversible metal electrodeposition for display applications was the relatively slow response for attaining adequate light blocking.

A reversible electrochemical mirror (REM) device permitting efficient and precise control over the reflection/transmission of visible light and other electromagnetic radiation is described in U.S. Pat. Nos. 5,903,382, 5,923,456, 6,111,685 and 6,166,847 to Tench et al., which are assigned to the same assignee as the present application. In this device, an electrolyte containing ions of an electrodepositable metal is sandwiched between a mirror electrode and a counter electrode, at least one of which is substantially transparent to the radiation. A typical transparent mirror electrode is indium tin oxide (ITO) or fluorine doped tin oxide (FTO) deposited on a transparent glass (or plastic) pane which serves as the substrate. Application of a voltage causes the electrodepositable metal, e.g., silver, to be deposited as a mirror on the mirror electrode while an equal amount of the same metal is dissolved from the counter electrode. When the voltage polarity is switched, the overall process is reversed so that the electrodeposited mirror metal is at least partially dissolved from the mirror electrode. A thin surface modification layer of noble metal, e.g., 15–30 Å of platinum, on the transparent conductor is usually required to improve nucleation so that a mirror deposit is obtained. The thickness of mirror metal layer present on the mirror electrode determines the reflectance of the device for radiation, which can be varied over a wide range.

The REM technology can be used to provide control of either light reflectance or transmission, or both. A transmissive REM device suitable for smart window applications utilizes a noble metal counter electrode that is locally distributed, as a grid for example, on a transparent substrate, e.g., glass or plastic, so that mirror metal deposited thereon does not appreciably increase light blockage. In this case, high light transmission is provided by a locally distributed counter electrode of relatively small cross-sectional area and the device reflectance/transmission is adjusted via the thickness of mirror metal on the mirror electrode. As described in U.S. Pat. No. 6,166,847 to Tench et al., which is assigned to the same assignee as the present application, such a transmissive counter electrode is not required for reflective REM devices used for adjustable mirror applications. An electrolytic solution providing the inherent stability, high deposit quality, complete deposit erasure, long cycle life, and reasonably fast switching needed for most practical applications is described in U.S. patent application Ser. No. 09/619,127, filed Jul. 18, 2000, to Tench et al., which is assigned to the same assignee as the present invention. This solution is typically comprised of 1.5 M AgI and 2.0 M LiBr in a gamma-butyrolactone (GBL) solvent, and may also contain highly dispersed silica (HDS) added to produce a gelled electrolyte and/or dispersed carbon added to blacken the electrolyte so as to reduce background light reflection.

Switching speed for REM devices is presently limited by the solubilities and transport rates of electrodepositable metal ions in the conventional solvent-based electrolytes available. For transmissive REM devices employing a localized distributed electrode (e.g., a grid), the maximum cell current is severely limited by the relatively small area of the counter electrode so that enhanced electrolyte current carrying capability would be particularly advantages. In addition, electrolytes having the high ionic strength and low ion pairing needed for fast switching also have relatively low electrical resistivity so that a wider cell gap is needed to provide sufficient electrolyte resistance for uniform mirror switching. Note that good mirror uniformity is obtained when the electrolyte resistance is large compared to the electrode sheet resistances. For large-area devices, the width of the cell gap required to provide an acceptable electrolyte resistance can greatly increase the electrolyte volume, and thus the cost and weight of the device. An electrolyte providing enhanced current carrying capability coupled with relatively high resistivity would greatly enhance performance of REM devices and broaden their potential applications. Faster switching speed is particularly important for display optical attenuators, and might also enable use of reversible electrodeposition devices for some types of displays.

A possible approach for increasing the allowable current densities for reversible electrodeposition reactions is to utilize ionic liquid electrolytes, which are comprised of mixtures of a metallic salt and an ionic organic compound that are liquid at or near ambient temperatures. Since no solvent is required, the concentration of electrodepositable metal ions in such electrolytes could conceivably be very high (around 6 M compared to 1 to 3 M for most solvent systems). Ionic liquids exhibiting reasonably high electrical conductivity generally involve heterocyclic organic cations having one or two nitrogen atoms in a five- or six-member ring structure. The most widely studied ionic liquids have been the chloroaluminate salts with $Al_nCl_{3n+1}^-$ cations (where n is typically between 1 and 2) and 1-ethyl-3-methylimidazolium ($EMI^+$) or N-butylpyridinium ($BuPy^+$) cations, from which aluminum metal can be electrodeposited.

From the teachings of the prior art literature, metal deposition from ionic liquids would appear to be unsuitable for reversible electrodeposition light modulation devices, especially those requiring high reflectance. For example, aluminum deposits obtained from neat $EMI^+$ chloroaluminate systems are reported to be powdery and nonadherent [Q. Liao, W. R. Pitner, G. Stewart, C. L. Hussey and G. R. Stafford, J. Electrochem. Soc. 144, 936 (1997)], or to range from dull gray to black depending on the deposition voltage [R. T. Carlin, W. Crawford and M. Bersch, J. Electrochem. Soc. 139, 2720 (1992)]. Better quality aluminum deposits (described as "silver white") can apparently be obtained from the $BuPy^+$ chloroaluminate system [M. R. Ali, A. Nishikata and T. Tsuru, Indian J. Chem. Technol. 6, 317 (1999)] but the maximum current density for this three-electron reaction was only about 3 $mA/cm^2$, which is equivalent in terms of deposited metal atoms to only 1 $mA/cm^2$ compared to one-electron silver deposition. A switching current density for REM devices of 4 $mA/cm^2$ is provided by the silver halide electrolyte with a GBL solvent described in U.S. patent application Ser. No. 09/619,127, filed Jul. 18, 2000, to Tench et al., which is assigned to the same assignee as the present application. The prior art literature further teaches that ionic liquid electrolytes provide shiny aluminum deposits only when mixed with conventional organic solvents (benzene or toluene, for example) and only over a very limited current density range [F. H. Hurley and T. P. Wier, Jr., J. Electrochem. Soc. 98, 207 (1951) and Q. Liao, W. R. Pitner, G. Stewart, C. L. Hussey and G. R. Stafford, J. Electrochem. Soc. 144, 936 (1997)], making them unsuitable for reversible electrodeposition optical modulation applications. In any case, silver is inherently more reflective for visible light than other metals and is preferred for REM light modulation devices.

The prior art literature further teaches that metals other than aluminum do not readily form ionic liquids suitable for reversible electrodeposition devices. For example, the maximum current density for deposition of cobalt from a chloride ionic liquid containing molar ratios of 3.2 Co(II), 5.4 $BuPy^+$ and 0.1 Cr(II) was less than 1 $mA/cm^2$ at 110° C. [M. R. Ali and T. Tsuru, Indian J. Chem. Technol. 8, 44 (2001)]. Consequently, prior art work has focused on utilizing chloroaluminate ionic liquids as solvents for the ions of the electrodeposited metal. For example, electrodeposition of copper from low concentrations of Cu(I) ions (20 mM or less) in the $EMI^+$ chloroaluminate solvent system has been investigated [Q. Zhu and C. L. Hussey, J. Electrochem. Soc. 148, C395 (2001); and J. J. Lee, B. Miller, X. Shi, R. Kalish and K. A. Wheeler, J. Electrochem. Soc. 148, C183 (2001)]. This solvent system has also been used to study electrodeposition of lanthanum at the solubility limit (only 45 mM) [T. Tsuda, T. Nohira and Y. Ito, Electrochim. Acta 46, 1891 (2001)]. Cobalt has been electrodeposited (two-electron process) from a 0.24 M solution of Co(II) ions in chloroaluminate $BuPy^+$ solvent but the maximum current density was only about 2 $mA/cm^2$ [M. R. Ali, A. Nishikata and T. Tsuru, Electrochim. Acta 42, 1819 (1997)]. Maximum current for deposition of copper from the alternative $EMI^+$ chlorozincate solvent containing 0.3 M Cu(I) was about 3 $mA/cm^2$ at 80° C. [P. Y. Chen, M. C. Lin and I. W. Sun, J. Electrochem. Soc. 147, 3350 (2000)]. These examples also illustrate that the approach of using an ionic liquid as a solvent greatly reduces the benefit that could otherwise be provided since the concentration of electrodeposited metal ions is thereby reduced and is limited by solubility considerations, as is the case with conventional solvents.

Ionic liquid electrodeposition of silver, the preferred REM mirror metal, has apparently only been studied at ambient temperatures for small concentrations of silver ion (25 mM) dissolved in liquid $EMI^+$ tetrafluoroborate [Y. Katayama, S. Dan, T. Miura and T. Kishi, J. Electrochem. Soc. 148, C102 (2001)] and $EMI^+$ chloroaluminate systems [Q. Zhu, C. L. Hussey and G. R. Stafford, J. Electrochem. Soc. 148, C88 (2001)]. Steady-state silver deposition currents for the unstirred liquids were less than 0.4 $mA/cm^2$ in both systems. For the tetrafluoroborate system, "a silver-white deposit without brightness" was obtained. Electrodeposition of silver and several other metals from fused mixtures of the metallic chlorides and ethyl pyridinium bromide at 135° C. has been reported [F. H. Hurley and T. P. Wier, Jr., J. Electrochem. Soc. 98, 203 (1951)] but this temperature would be unsuitable for most optical modulation devices and the quality of the electrodeposits obtained was not stated.

SUMMARY OF THE INVENTION

The present invention is a reversible electrodeposition optical modulation device employing an ionic liquid electrolyte, which is comprised of a mixture of an ionic organic compound and the salt of an electrodepositable metal. For high concentrations of electrodepositable metal ions in the ionic liquid electrolyte, the effects of mass transport limitations are minimized and high currents for metal deposition and dissolution can be sustained. It is generally preferable to maximize the concentration of electrodepositable metal ions by utilizing an ionic liquid not containing substantial quantities of other metal ions. In this case, the concentration of electrodepositable metal ions and the diffusion-limited deposition/dissolution currents can be as much as four times higher than those for a typical solvent-based electrolyte. In addition, the conductivities of ionic liquids are usually at least an order of magnitude lower than those of electrolytes employing a solvent, which enhances the uniformity of the electrodeposit obtained for a given set of conditions. Thus, the ionic liquid electrolyte of this invention also enables uniform electrodeposition (and electrodissolution) with thinner electrolyte layers, which can significantly reduce the cost of the electrolyte. Ionic liquids also offer a wide operating temperature range and have practically no vapor pressure, which facilitates device sealing and operation at elevated temperatures. At ambient temperatures, ionic liquids tend to be very viscous and adhesive, which expands cell assembly options and minimizes electrolyte splattering during cell breakage.

One embodiment of the present invention is a reversible electrochemical mirror (REM) device employing an ionic liquid electrolyte (containing electrodepositable metal ions) in contact with a transparent mirror-forming electrode and a counter electrode. The mirror electrode is typically comprised of a thin surface modification layer of noble metal (e.g., platinum) on a layer of a transparent conducting oxide (e.g., indium tin oxide) on a glass or plastic substrate. The noble metal layer enhances nucleation so that mirror electrodeposits are obtained. Generally, the counter electrode is a sheet or layer of the electrodepositable mirror metal for devices that are designed to control radiation reflection, and is a locally distributed inert metal electrode for devices that also transmit radiation. The device reflectance is determined by the thickness of the mirror metal layer on the mirror electrode, which can be adjusted by applying a voltage of the appropriate polarity to cause mirror metal electrodeposition or dissolution, while the reverse process occurs at the counter electrode. Applications for REM devices include automotive rear and side view mirrors with adjustable reflectivity, attenuators for display brightness control, and smart windows for use in transportation vehicles and buildings.

Another embodiment of the present invention is a reversible electrodeposition display device employing an ionic liquid electrolyte. A typical device of this type involves reversible metal electrodeposition on electrically isolated and separately addressable electrodes, which serve as display elements (e.g., pixels or alpha-numeric segments). Use of an ionic liquid electrolyte for display devices provides both faster switching and enhanced electrolyte resistance, which enhances switching uniformity and suppresses crosstalk between display elements. Poorly-reflecting electrodeposits may be used on display elements to block or absorb light, or an inert surface modification layer may be used to provide mirror deposits that reflect light. Reflective elements may be viewed directly or used for projection displays.

Suitable ionic liquids for reversible electrodeposition optical modulation devices include those comprised of electrodepositable metal ions, halide (or pseudohalide) anions, and heterocyclic-organic cations having one or two nitrogen atoms in a five- or six-member ring structure. Suitable organic cations include N-methylpyrrolidiinum ($MP^+$), pyrrolidinium ($P^+$), 1-ethylimidazolium ($EI^+$), 1-ethyl-3-methylimidazolium ($EMI^+$), 2-methyl-1-pyrrolinium ($2M1P^+$) and N-butylpyridinium ($BuPy^+$). Silver is a preferred metal since it provides high reflectivity (needed for REM devices) and is electrodeposited in a one-electron process (enhances switching speed). A variety of other metals can be used, including copper (which can involve a one-electron process), tin, zinc and alloys thereof. Ionic liquids made with these metals tend to be substantially transparent to visible light. Preferred anions are halides (fluoride, chloride, bromide and iodide) and pseudohalides (cyanide and thiocyanate), which provide the metal complexing needed for ionic liquid formation and more controlled metal deposition. Other anions whose compounds with organic cations form ionic liquids with electrodepositable metal salts may also be used. The ionic liquid electrolyte of the present invention may be rendered more viscous, semi-solid or solid by addition of organic or inorganic gelling agents. Inorganic or organic materials, including suspended carbon and dissolved dyes, may be added to the electrolyte to impart a desired color or to reduce background reflection. Some ionic liquids tend to slowly crystallize at room temperature to form opaque solids but this can be avoided by use of low-symmetry cations, mixtures of different cations, or mixed anions to introduce chemical asymmetry.

Halide ionic liquid electrolytes containing pyrrolidinium and N-methylpyrrolidinium cations have been found to provide particularly high current carrying capability for reversible electrodeposition of a variety of metals, including silver, copper, tin, zinc, and silver-palladium alloys. Good mirror formation in REM devices was observed in all cases. These cations (in halide systems) also provided moderately high electrical resistivity. For pyrrolidinium-based silver halide ionic liquids, the current carrying capability for reversible electrodeposition was usually greater than 10 $mA/cm^2$ and the resistivity varied from 300 to 1200 ohm-cm, depending primarily on the halides used. Good mirror uniformity was obtained with ionic liquids incorporating these cations in REM cells having even small electrode spacings (0.2 mm). Systems incorporating mixtures of the two cations and/or different halides (chloride, bromide and iodide) did not crystallize at ambient temperatures and were apparently stable over the temperature range from at least −20° C. to 150° C. Finely-divided carbon suspended in a pyrrolidinium-based electrolyte provided a REM device with low reflectivity and did not appear to otherwise affect the device performance. A semi-solid gel electrolyte was formed by addition of highly dispersed silica (HDS). A variety of pyrrolidinium derivatives might also be used as cations for reversible electrodeposition ionic liquid electrolytes.

Optimum switching of reversible electrodeposition devices employing ionic liquid electrolytes is attained by automatically adjusting the drive voltage (depending on the current) to compensate for the resistive loss (IR drop) in the electrolyte. Fast switching is provided by measuring the current and increasing the drive voltage by the magnitude of the voltage drop in the electrolyte. Device degradation due to excessive electrode voltage is avoided by decreasing the applied voltage as the current and the electrolyte IR drop decrease during the later stages of deposit erasure.

A REM device with an ionic liquid electrolyte comprised of 28.5 mole % pyrrolidinium chloride, 28.5 mole % N-methylpyrrolidinium chloride and 43 mole % silver chloride was cycled with an IR-compensated applied voltage at an average current of 8 mA/cm$^2$ for 35,000 cycles (between 0 and 500 Å silver mirror) with no change in mirror quality or switching performance. This is double the maximum current density for the best GBL electrolyte (1.5 M AgI+2.0 M LiBr) used in REM cells.

Further features and advantages of the invention will be apparent to those skilled in the art from the following detailed description, taken together with the accompanying drawings.

DETAILED DESCRIPTION OF THE INVENTION

Figure 1:
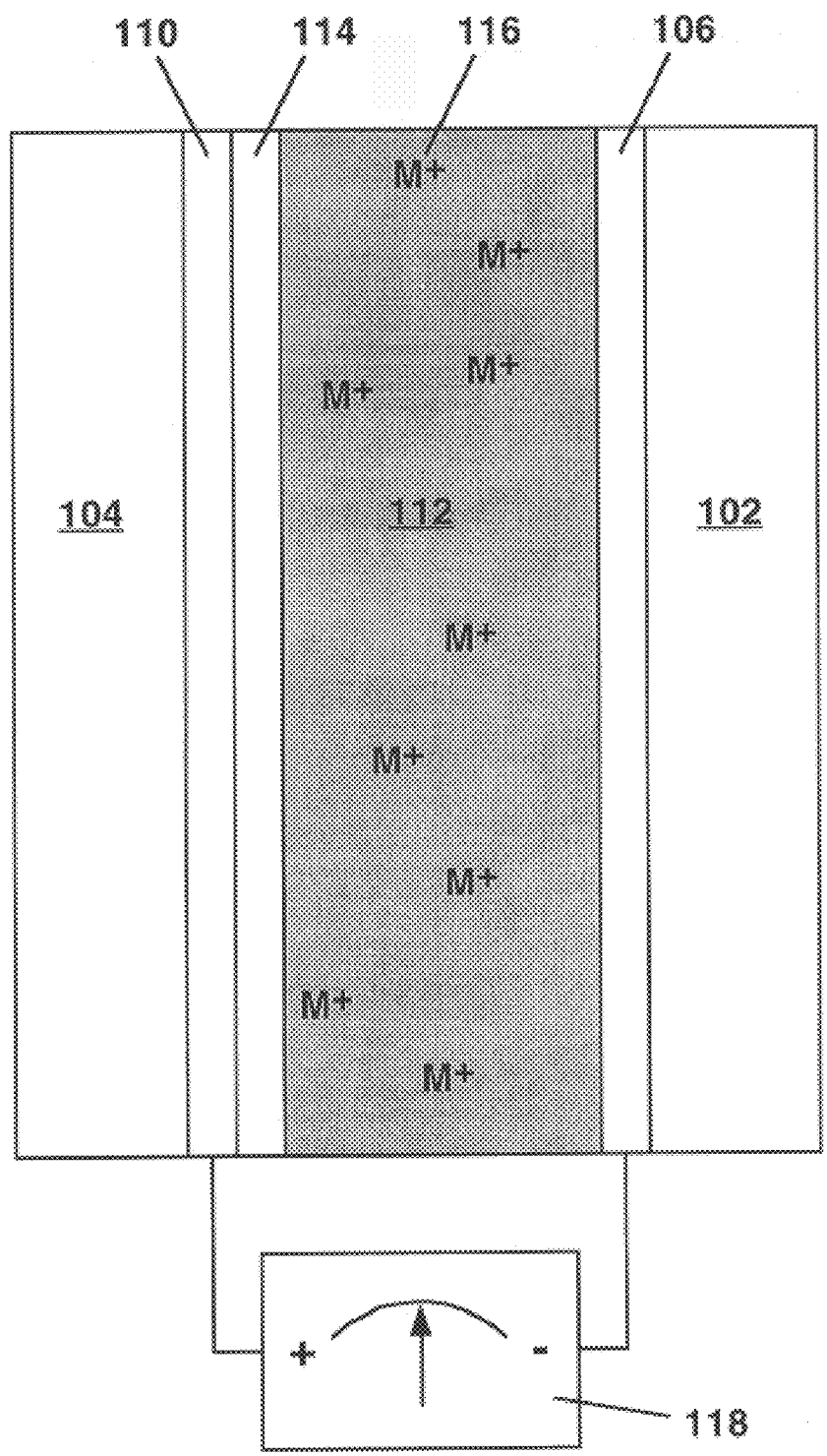
FIG. 1 is a cross-sectional view of a REM variable reflectivity device employing the ionic liquid electrolyte of the present invention.

The present invention is a reversible electrodeposition optical modulation device employing an ionic liquid electrolyte comprised of a mixture of an ionic organic compound and the salt of an electrodepositable metal. The component compounds are typically solids but the mixtures are liquid at or near ambient temperatures. Pure ionic liquid electrolytes not involving transition metals are generally transparent to visible light. Since no solvent is required, the concentration of electrodepositable metal ions in such electrolytes can be very high (around 6 M compared to 1 to 3 M for most solvent systems). Furthermore, in some systems, the metal electrodeposition and dissolution processes can proceed at faster rates with little overvoltage since the ion solvation and desolvation steps, which are often rate limiting, are avoided. Consequently, the device switching rate can be much faster since the diffusion-limited current for metal electrodeposition is much higher and the metal electrodissolution process is not slowed by solvation effects.

It is generally preferable to maximize the concentration of electrodepositable metal ions by utilizing an ionic liquid containing insubstantial quantities of other metal ions. In some cases, however, ions of non-electrodeposited metals may be added, to modify, for example, the kinetics of the reversible metal electrodeposition process or the physical properties of the electrolyte (e.g., melting point or viscosity), or to impart a desirable color to the electrolyte. Ions of metals that codeposit with the primary electrodepositable metal may be added to improve device performance or to provide alloy deposits having specific desirable properties.

Another advantage of the present invention is that the resistivity of ionic liquid electrolytes is generally about an order of magnitude greater than solvent-based electrolytes, which tends to significantly improve the uniformity of the electrodeposit. This is because reductions in voltage toward the center of the electrode, which occur due to electrode sheet resistance effects, represent a smaller fraction of the total voltage drop when the series electrolyte resistance is higher. The greater inherent switching uniformity provided by the ionic liquid electrolyte can also be used to reduce the electrode spacing and the cost of the electrolyte.

The ionic liquid electrolyte of the present invention provides other important advantages. Ionic liquids typically have a wide operating temperature range and have practically no vapor pressure even at elevated temperatures, properties which make such electrolytes ideal for applications in outer space. At ambient temperatures, ionic liquids tend to be very viscous and adhesive, which facilitates cell assembly and minimizes electrolyte splattering during cell breakage. The combined attributes of high viscosity and negligible vapor pressure provide additional options for cell assembly. For example, a very viscous ionic liquid electrolyte might be sealed in place between the two electrodes via heat fusion of a plastic sealant or a plastic electrode substrate itself. The ionic liquid electrolyte could be applied to one of the electrodes in a pattern, for example, by stenciling. It could also be sprayed since we have shown that pyrrolidinium-based ionic liquids can be thinned with acetonitrile, which can be subsequently removed by evaporation. On the other hand, ionic liquids tend to become less viscous at elevated temperatures and can also be injected into cells, via a hypodermic needle for example.

FIG. 1 is a cross-sectional view of a REM variable reflectivity device employing the ionic liquid electrolyte of the present invention. Some dimensions, particularly layer thicknesses, are disproportionate in the drawings in order to more effectively illustrate the structure and function of the device. A REM device for modulation of reflected radiation is described in U.S. Pat. No. 6,166,847 to Tench et al., which is assigned to the same assignee as the present application. The REM device in the present example, which provides precise control over the reflection of electromagnetic radiation, includes a first substrate 102, which is substantially transparent to the portion of the spectrum of electromagnetic radiation to be controlled, and a second substrate 104. An electrically conducting film 106, which is also substantially transparent, is disposed on the first substrate. The film 106, with the optional addition of an electrochemically stable surface modification layer 108, functions as the mirror electrode. The transparent conducting film 106 is typically indium tin oxide or fluorine-doped tin oxide but may also be comprised of another material, for example, aluminum-doped zinc oxide, antimony-doped tin oxide, indium oxide, fluorine-doped indium oxide, aluminum-doped tin oxide, phosphorus-doped tin oxide, or indium zinc oxide. The surface modification layer 108 is typically a noble metal selected from the group consisting of platinum, iridium, gold, osmium, palladium, rhenium, rhodium and ruthenium. An underlayer of another metal (e.g., aluminum, chromium, hafnium, molybdenum, nickel, titanium, tungsten or zirconium) may be used to improve the adhesion of surface modification layer 108.

As also shown in FIG. 1, a second electrode 110 is disposed on the second substrate 104 and functions as the counter electrode. The second electrode 110 may have the same or similar composition and structure as the first electrode 106, including the surface modification layer 108 and its optional underlayer. The counter electrode 110 can alternatively be a bulk electrode, a metal plate or sheet for example, with sufficient rigidity that the second substrate 104 would not be needed. The counter electrode 110 is electrochemically stable or is covered with a sufficient thickness of an active metal layer 114 to avoid exposure of the counter electrode surface to the electrolyte. It may also be protected from exposure to the electrolyte by a coating of electrochemically stable metal. Relatively stable metals that might be used as the counter electrode material or as a protective layer or coating on the counter electrode include Pt, Ir, Au, Os, Pd, Re, Rh, Ru, Cr, Ni, Ti and stainless steel. The surface of electrode 110 may be roughened to reduce reflection of radiation from the electrode or to improve switching speed by lowering the current density (via increased surface area). The REM cell may be initially charged with mirror metal prior to assembly by depositing the metallic layer 114 on the electrode 110, by depositing a metallic layer 120 on the surface modification layer 108 of electrode 106 or, as depicted in FIG. 1, by depositing a portion of the mirror metal on each of the two electrodes, divided between layers 114 and 120.

An ionic liquid electrolyte 112, containing electrodepositable mirror metal ions 116, is located between and in electrical contact with electrodes 106 and 110 (or layer 108 or, depending on the switched state of the device, layers 120 or 114). Metal ions 116, which contain the same metal atoms as the layers 114 and 120, can be reversibly electrodeposited on and electrodissolved from the mirror and counter electrodes. Surface modification layer 108 enhances nucleation for the metal electrodeposition process so that metal electrodeposited in layer 120 is continuous and fine-grained so as to exhibit high reflectivity for radiation. The thickness of electrodeposited mirror metal layer 120 present on the mirror electrode determines the reflectivity of the mirror for radiation, which can be varied over a wide range from nearly 0% to almost 100% reflective. The lower limit of reflectivity for the REM device is affected by the reflectivities of the surface modification layer 108, the electrode 106, and the substrate 102. These reflectivities may be reduced by use of anti-reflection coatings of the type commonly employed, or by adjusting the layer thicknesses. Likewise, the maximum reflectivity of the REM device is affected by light absorption in the substrate 102, the electrode 106, and the surface modification layer 108.

The REM device is intended for use in conjunction with a source of voltage 118, which has a reversible polarity and adjustable or pre-set positive and negative voltage values, connected between the mirror and counter electrodes 106 and 110. When a negative electrical voltage is applied to the mirror electrode 106 relative to the counter electrode 110, metal 114 deposited on the counter electrode 110 is dissolved from the counter electrode into the electrolyte 112, while metal ions 116 in the electrolyte are electrodeposited from the electrolyte onto the surface modification layer 108 of the mirror electrode 106. When the polarity of the applied voltage is reversed, such that a positive voltage is applied to the mirror electrode 106 relative to the counter electrode 110, deposited metal is dissolved from the mirror electrode into the electrolyte 112 and dissolved metal is electrodeposited from the electrolyte onto the counter electrode.

Figure 2:
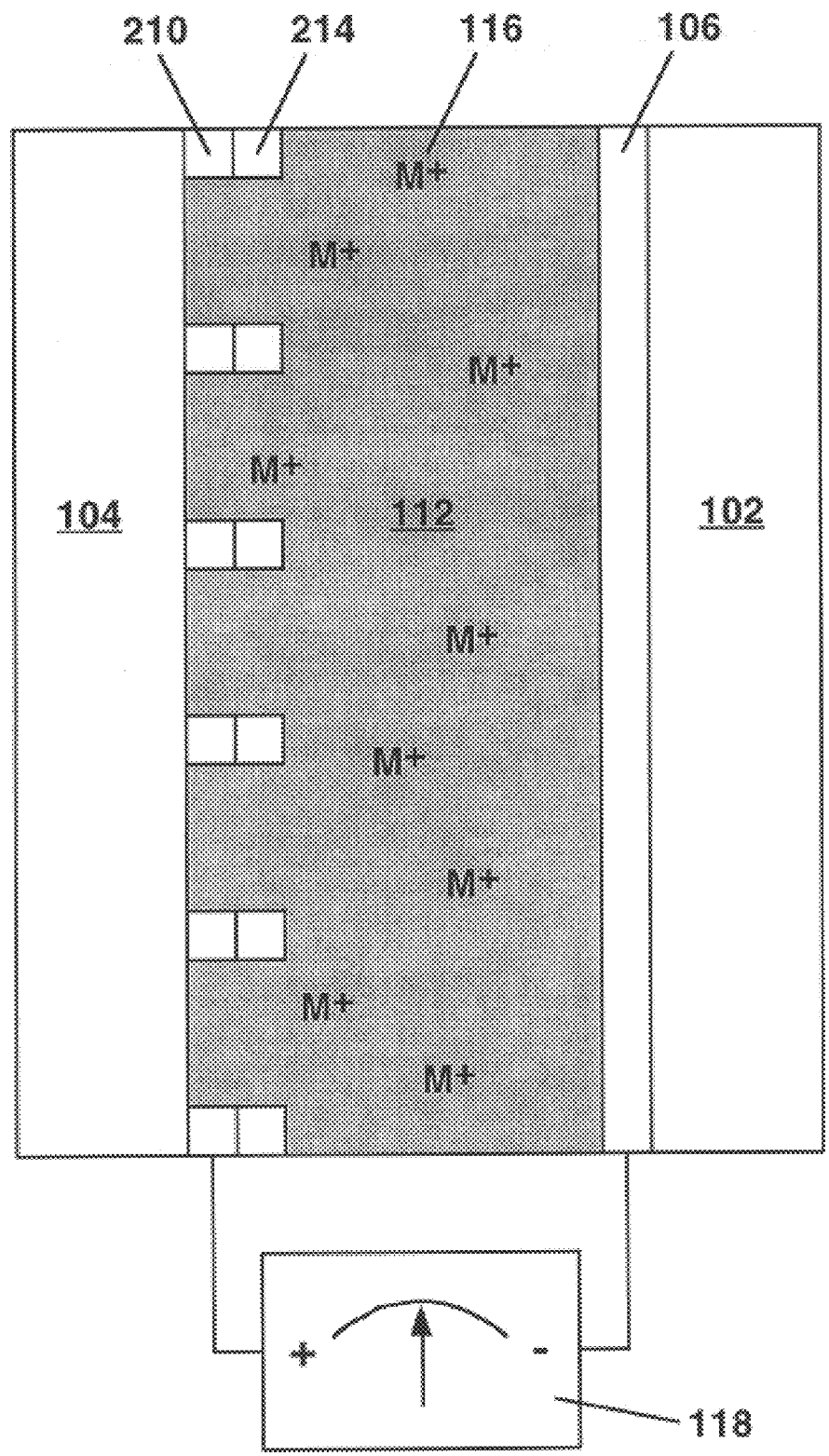
FIG. 2 is a cross-sectional view of a REM variable transmission device employing the ionic liquid electrolyte of the present invention.

FIG. 2 is a cross-sectional view of a REM variable transmission device employing the ionic liquid electrolyte of the present invention. This device is similar to the adjustable reflectivity device shown in FIG. 1, except that the counter electrode 210 is a locally distributed electrode, as described in U.S. Pat. No. 5,923,456 to Tench et al., which is assigned to the same assignee as the present application. In this case, mirror metal 214 electrodeposited on locally distributed electrode 210 is disposed only in local areas and does not substantially decrease the transmission of the device for radiation. Because the surface area of locally distributed electrode 210 is typically small compared to that of mirror electrode 106, the current density for electrode 210 is proportionately higher. Consequently, the high current carrying capability of the ionic liquid electrolyte 112 is particularly advantageous for transmissive REM devices.

Another embodiment of the present invention is a reversible electrodeposition display device employing an ionic liquid electrolyte. In this case, metal is reversibly electrodeposited onto electrically isolated and separately addressable electrode segments, which typically serve as the display pixels or alpha-numeric components. Alternatively, electrode segments on the counter electrode induce localized reversible metal electrodeposition on a continuous transparent display electrode separated by a small cell gap to minimize plating in adjacent areas. Reversible electrodeposition display devices described in the prior art literature employed solvent-based electrolytes (aqueous and nonaqueous), and involved electrodeposits of low reflectivity and counter electrode reactions other than reversible metal deposition [see for example, J. Mantell and S. Zaromb, J. Electrochem. Soc. 109, 992 (1962) and J. P. Ziegler and B. M. Howard., Solar Eng. Mater. Solar Cells 39, 317, (1995)]. The ionic liquid electrolyte of the present invention may also be employed in display devices involving reversible electrodeposition of highly reflective electrodeposits, obtained on a patterned surface modification layer, for example. Reflective elements may be viewed directly or used for projection displays. Use of the ionic liquid electrolyte of the present invention for display devices provides both faster switching and high electrolyte resistance, which enhances display uniformity and suppresses cross-talk between display elements.

Suitable ionic liquids for reversible electrodeposition optical modulation devices include those comprised of electrodepositable metal ions, halide anions (chloride, bromide and iodide), and heterocyclic organic cations having one or two nitrogen atoms in a five- or six-memberring structure. Halide ions (designated $X^-$) effectively complex the electrodepositable metal ions, which is required for ionic liquid formation and controlled metal electrodeposition. The electrodepositable metal ions are typically present as complex anions (e.g., $AgX_2^-$ and $CuX_2^-$). Other complexing ions, pseudohalides (cyanide and thiocyanate) for example, could also be used. At least in halide systems, a variety of electrodepositable metals can be used, including silver, copper, zinc, tin and alloys thereof. Ionic liquids made with these metals tend to be substantially transparent to visible light. Other electrodepositable metals that might be used, at least for alloy deposits, include bismuth, palladium, cadmium, mercury, indium, lead, antimony and thallium. The silver and copper electrodeposition processes in ionic liquids involve a one-electron transfer, which tends to provide faster switching rates. Silver is preferred for REM devices since it provides high reflectivity compared to other metals. Halides are preferred anions since they provide the metal complexing needed for ionic liquid formation and controlled metal deposition. Relatively noble metals, e.g., palladium, that are not readily electrodissolved in the pure state can be used as minor constituents in ionic liquids to enhance the cycle characteristics or provide alloy deposits with improved properties.

After formation at elevated temperature, some ionic liquids tend to slowly crystallize at room temperature to form opaque solids. Ionic liquid crystallization is generally suppressed by chemical asymmetry and may be avoided by use of asymmetrical cations, mixtures of different cations and/or mixed halides.

Although high electrolyte resistivity tends to provide good electrodeposit uniformity, ionic liquid electrolytes exhibiting excessive resistivity also tend to have relatively low current carrying capabilities for metal electrodeposition. Optimum performance for reversible electrodeposition optical modulation devices is provided by ionic liquid electrolytes having moderately high resistivities (500 to 1500 ohm-cm). Ionic liquids exhibiting moderately high electrical resistivity generally involve heterocyclic organic cations having one or two nitrogen atoms in a five- or six-member ring structure.

Figure 3:
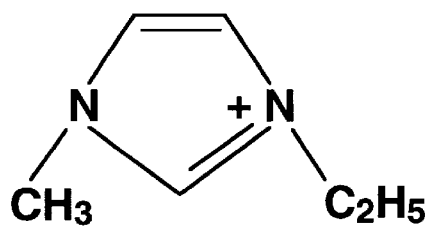
FIG. 3 depicts the chemical structures of some representative ionic liquid cations reported to offer relatively low resistivity.
Figure 3:
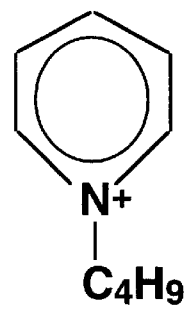
Figure 3:
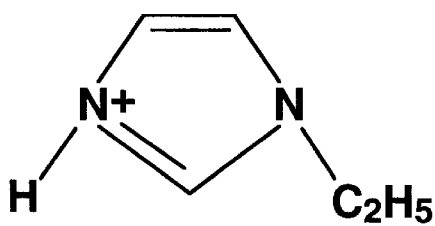
Figure 3:
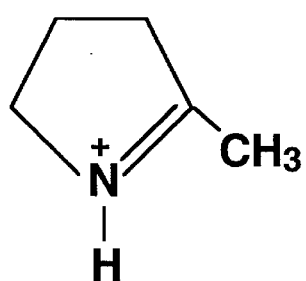

FIG. 3 depicts the chemical structures of some representative cations (1-ethyl-3-methylimidazolium, N-butylpyridinium, 1-ethyl-imidazolium and 2-methyl-1-pyrrolinium) that have been reported in the literature to provide ionic liquid electrolytes having relatively low resistivities compared to other ionic liquid electrolytes. Ionic liquid electrolytes were prepared with the 1-ethyl-3-methylimidazolium (EMI$^+$) and N-butylpyridinium (BuPy$^+$) cations by mixing their chloride salts with silver chloride (1:0 to 0.75 mole ratio) at about 100° C. (with stirring). The neat EMI$^+$ electrolyte could sustain reversible silver deposition currents of about 4 mA/cm$^2$ and had a resistivity of about 900 ohm-cm but tended to crystallize at room temperature. Crystallization was prevented by replacing 10% of the EMI$^+$ cations with BuPy$^+$ cations. This mixed ionic liquid electrolyte could sustain reversible silver deposition currents of more than 3 mA/cm$^2$ and had a resistivity of about 2200 ohm-cm. Ionic liquids based on these conventional anions offer the high electrical resistivity needed for uniform switching of reversible electrodeposition devices, as well as moderate current carrying capability.

Preferred ionic liquid electrolytes for the present invention are based on the protonated pyrrolidine cations, pyrrolidinium (P$^+$) and N-methylpyrrolidinium (MP$^+$), which have not previously been used to form ionic liquids with electrodepositable metal salts or to perform electrodeposition processes. Included in this group are the protonated-amine cations, 2-methyl-1-pyrrolinium and 1-ethylimidazolium, which, along with MP$^+$, have recently been shown to form highly conducting ionic liquids [M. Hirao, H. Sugimoto, and H. Ohno, J. Electrochem Soc. 147, 4168 (2000); M. Yoshizawa, W. Ogihara, and H. Ohno, Electrochem. And Solid State Lett. 4, E25 (2001)]. The unsubstituted P$^+$ cation, which has not previously been used for ionic liquids, appears to provide the highest current carrying capability for the device of the present invention.

Silver halide electrolytes formed with the protonated pyrrolidine cations provide both the moderately high electrical resistivity and high current carrying capability (>10 mA/cm$^2$) needed for optimum performance in reversible electrodeposition optical modulation devices. The resistivity of such electrolytes tends to increase with the size of the halide (iodide>bromide>chloride) and can be varied over the range from at least 300 to 1200 ohm-cm for silver systems. Ionic liquids incorporating mixtures of the P$^+$ and MP$^+$ cations and/or different halides do not readily crystallize and are apparently stable over the temperature range from at least −20° C. to 150° C. Reversible mirror formation in REM devices with pyrrolidinium-based ionic liquids has been demonstrated for silver, copper, tin, zinc, silver-copper alloys, and silver-palladium alloys.

Within the scope of the present invention, the ionic liquid electrolyte may be modified in a variety of ways. Inorganic or organic coloring agents may be added for aesthetic reasons or to reduce background reflection. For example, suspended carbon renders the electrolyte black (and highly light absorbing) and cobalt (2+) ions impart a deep blue color. If found to be soluble, organic gelling agents, for example, polyacrylonitrile (PAN), polyvinylalcohol (PVA), polyvinylacetate (PVOAc) and polymethylmethacrylate (PMMA), might be used to increase the rigidity of ionic liquid electrolytes. For ionic liquids based on pyrrolidinium and N-methylpyrrolidinium cations, which hydrogen bond via the amine protons, addition of highly dispersed silica (HDS) produces thixotropic gels. Other ceramic materials, alumina for example, might also be used as gelling agents.

Figure 4:
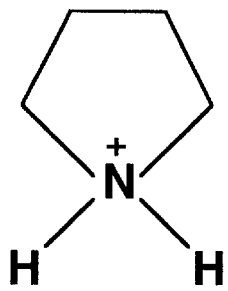
FIG. 4 depicts the chemical structures of some pyrrolidinium-based cations.
Figure 4:
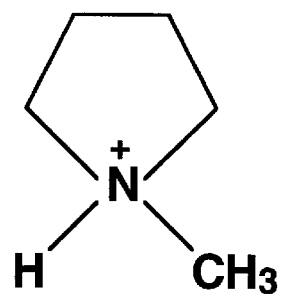
Figure 4:
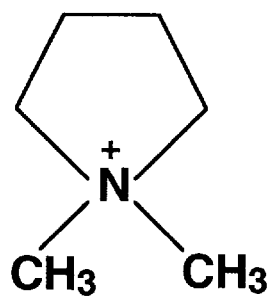
Figure 4:
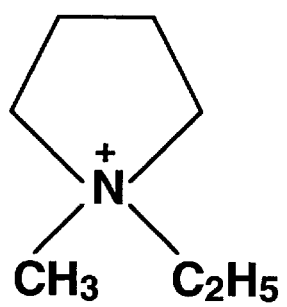
Figure 4:
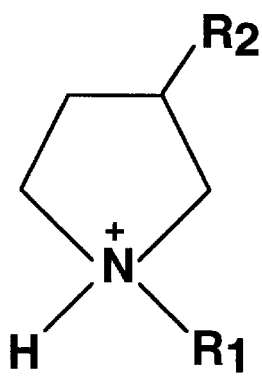

FIG. 4 depicts the chemical structures of the pyrrolidinium and N-methylpyrrolidinium cations, and derivatives thereof, that are preferred for the ionic liquid electrolyte of the device of the present invention. A variety of pyrrolidinium derivatives might be used as cations for reversible electrodeposition ionic liquid electrolytes. These include protic and aprotic cations having various combinations of alkyl groups attached to the ring nitrogen atom (i.e., N-alkylpyrrolidinium and N,N-dialkylpyrrolidinium species) and/or to a ring carbon (i.e., N—R$_1$-3-R$_2$-pyrrolidinium and N,N—R$_1$R$_2$-3R$_3$-pyrrolidinium). The R-groups in this case may be hydrogen or any alkyl group (e.g., methyl, ethyl, propyl and butyl) but larger groups tend to increase the electrical resistivity of the ionic liquid.

For optimum switching of reversible electrodeposition devices employing ionic liquid electrolytes, the drive voltage should be adjusted (depending on the current) to compensate for the resistive loss (IR drop) in the electrolyte. This is because the high drive voltages required to overcome the electrolyte resistive losses and provide fast device switching are typically high enough to cause breakdown of the electrolyte or damage to the electrode surface. Reduction of amine protons on pyrrolidinium and N-methylpyrrolidinium cations occurs at particularly low voltages (around −0.1 V) and results in irreversible loss of free silver via the corresponding anodic oxidation process at the counter electrode. If a constant drive voltage is used, an increasing fraction of the applied voltage appears across the electrode-electrolyte interface as the current (and the electrolyte IR drop) decrease during the final stages of deposit erasure, which can produce electrolyte breakdown or electrode damage. Fast switching without device degradation is provided by measuring the current in real time and automatically applying a voltage that is the sum of a safe minimum value plus the resistive voltage loss (IR drop) in the electrolyte. As the current decreases during erasure, the voltage is decreased by the electrolyte IR drop so that the voltage at the electrode surface remains at a safe value. This IR-compensated switching is preferably performed under computer control.

Fabrication of a Preferred Embodiment

A preferred embodiment of the present invention is a REM device employing an ionic liquid electrolyte comprised of silver ions, halide anions (chloride, bromide, iodide or mixtures thereof) and one or more protonated-amine cations, including pyrrolidinium, N-methylpyrrolidinium, 2-methyl-1-pyrrolinium and 1-ethylimidazolium. Such electrolytes provide fast switching (high current carrying capability) and good mirror uniformity via moderately high electrical resistivity. Applications for such a REM device include, for example, automotive rear and side view mirrors with adjustable reflectivity, attenuators for display brightness control, and smart windows for use in transportation vehicles and buildings.

Another preferred embodiment of the present invention is a REM device employing an ionic liquid electrolyte having high electrical resistivity (>1500 ohm-cm) so that very uniform mirrors are provided over large areas. Since the current carrying capability is typically relatively low in this case, such a device is more appropriate for applications not requiring fast switching speed, smart windows for example. In this case, suitable ionic liquid electrolytes include those based on the aprotic N-butylpyridinium and 1-ethyl-3-methylimidazolium cations, and mixtures thereof. Mixtures of these cations with protonated-amine cations may also be used.

For the electrolytes of these preferred embodiments, other electrodepositable metals, including copper, tin, zinc and mixtures thereof, may also be used. A more noble metal, palladium for example, may be added to produce an alloy electrodeposit having a desirable property, fine grains for example. A transition metal ion, cobalt for example, may be added to impart a desirable color to the electrolyte (or to improve the electrodeposit properties or device cycling characteristics). An organic dye may also be added or suspended carbon may be used to darken the electrolyte so as to reduce background reflection of the device. The ionic liquid electrolyte may be stiffened via addition of organic gelling agents or highly dispersed ceramic materials, silica or alumina for example.

Reflective REM devices (2×3 cm mirror area) employing ionic liquid electrolytes according to the present invention were fabricated and tested at room temperature. The mirror electrode was comprised of a 15 Å sputtered platinum surface modification layer on 10 ohm-square ITO on a glass pane (1 mm thick). The counter electrode was a thin foil or sputtered layer of silver supported by a glass pane. Electrical contact to the electrode layers was established via silver epoxy or conductive copper tape. Platers' tape (0.2 mm thick) was used as an electrode spacer. The ionic liquid electrolyte was squeezed between the two electrodes and sealed with epoxy (after removal of excess electrolyte).

The current carrying capability (maximum sustainable current density) was determined by cycling the cell voltage at 50 mV/s and increasing the voltage limits until the current-voltage curve deviated from linearity and exhibited increased hysteresis. The electrolyte resistance determined from the slope of the current-voltage curve in the linear region generally agreed with that determined by ac impedance measurements (5–10 kHz).

Devices were switched between the mirror state (about 500 Å of electrodeposited metal) and the fully erased state using either a constant voltage (short-term only) or a variable voltage compensated for the electrolyte IR drop. In both cases, the voltage was applied by an electronic potentiostat. For IR-compensated switching, the current was monitored and a programmed computer automatically adjusted the applied voltage to be a safe minimum value (0.1 V) plus the IR drop in the electrolyte. This provided fast switching while avoiding excessive voltage at the electrode-electrolyte interface.

The pyrrolidinium and N-methylpyrrolidinium halide compounds (PCl, PBr, MPCl and MPBr) were synthesized by reacting the corresponding pyrrolidine derivative (dissolved in water) with concentrated hydrochloric or hydrobromic acid. Water and excess acid was removed by vacuum evaporation at room temperature followed by overnight heating at 70° C. under vacuum. The EMI$^+$ and BuPy$^+$ chloride salts were purchased commercially. All of the salts are extremely hygroscopic and were stored and handled inside a dry nitrogen-filled glove box. Ionic liquid components were weighed into sealable vials and heated with stirring on a hot plate set at 120° until liquefaction occurred.

For the examples presented below, the ionic liquid electrolytes were transparent and did not crystallize. In all cases, uniform mirrors of high quality were obtained during repetitive cycling at various voltages (up to that producing the maximum sustainable current).

EXAMPLE 1

A REM device with an ionic liquid electrolyte comprised of 28.5 mole % pyrrolidinium chloride, 28.5 mole % N-methylpyrrolidinium chloride and 43 mole % silver chloride exhibited a maximum current carrying capability of 14 mA/cm$^2$ (at 0.75 V) and an electrolyte resistivity of about 300 ohm-cm. This cell was cycled with an IR-compensated applied voltage at an average current of 8 mA/cm$^2$ for 35,000 cycles (between 0 and 500 Å silver mirror) with no change in mirror quality or switching performance. The current density in this case was arbitrarily chosen for test purposes and could undoubtedly be higher.

EXAMPLE 2

A REM device with an ionic liquid electrolyte comprised of 28.5 mole % pyrrolidinium bromide, 28.5 mole % N-methylpyrrolidinium bromide and 43 mole % silver bromide exhibited a maximum current carrying capability of 15 mA/cm$^2$ (at 2.0 V) and an electrolyte resistivity of about 500 ohm-cm.

EXAMPLE 3

A REM device with an ionic liquid electrolyte comprised of 28.5 mole % pyrrolidinium bromide, 28.5 mole % N-methylpyrrolidinium bromide and 43 mole % silver iodide exhibited a maximum current carrying capability of 12 mA/cm$^2$ (at 3 V) and an electrolyte resistivity of about 1250 ohm-cm.

EXAMPLE 4

A REM device with an ionic liquid electrolyte comprised of 57 mole % N-methylpyrrolidinium chloride and 43 mole % silver bromide exhibited a maximum current carrying capability of 11 mA/cm$^2$ (at 1.2 V) and an electrolyte resistivity of about 450 ohm-cm.

EXAMPLE 5

A REM device with an ionic liquid electrolyte comprised of 57 mole % N-methylpyrrolidinium bromide and 43 mole % silver iodide exhibited a maximum current carrying capability of 8 mA/cm$^2$ (at 1.7 V) and an electrolyte resistivity of about 950 ohm-cm.

EXAMPLE 6

A REM device with an ionic liquid electrolyte comprised of 53 mole % N-methylpyrrolidinium bromide and 47 mole % silver chloride exhibited a maximum current carrying capability of 7 mA/cm$^2$ (at 1.4 V) and an electrolyte resistivity of about 950 ohm-cm.

EXAMPLE 7

A REM device with an ionic liquid electrolyte comprised of 43 mole % 1-ethyl-3-methylimidazoliumchloride, 14 mole % 1-N-butylpyridiniumchloride and 43 mole % silver chloride exhibited a maximum current carrying capability of 2 mA/cm$^2$ (at 3 V) and an electrolyte resistivity of about 5600 ohm-cm.

EXAMPLE 8

A REM device with an ionic liquid electrolyte comprised of 51 mole % 1-ethyl-3-methylimidazolium chloride, 6 mole % N-methylpyrrolidinium chloride and 43 mole % silver chloride exhibited a maximum current carrying capability of 3.4 mA/cm$^2$ (at 2.5 V) and an electrolyte resistivity of about 2200 ohm-cm.

EXAMPLE 9

A REM device with an ionic liquid electrolyte comprised of 19 mole % 1-ethyl-3-methylimidazoliumchloride, 19 mole % N-methylpyrrolidinium bromide, 19 mole % pyrrolidinium chloride and 43 mole % copper (1+) iodide exhibited a maximum current carrying capability of 14 mA/cm$^2$ (at 2 V) and an electrolyte resistivity of about 400 ohm-cm.

The preferred embodiments of the present invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. A reversible electrodeposition device for controlling the propagation of electromagnetic radiation, comprising:
    a first electrode which is substantially transparent to the radiation;
    a second electrode; and
    an ionic liquid electrolyte disposed between and in electrical contact with said first and second electrodes, said ionic liquid electrolyte comprising:
        ions of an electrodepositable metal,
        organic cations, and
        complexing anions,
    such that a negative electrical potential applied to the first electrode relative to the second electrode tends to cause metal to be electrodeposited from the electrolyte onto the first electrode, and
    such that a positive electrical potential applied to the first electrode relative to the second electrode tends to cause deposited metal to be dissolved from the first electrode,
    wherein the amount of deposited metal subsisting on the first electrode affects the propagation of radiation by the device.

2. The device of claim 1, wherein said organic cations are heterocyclic organic cations.

3. The device of claim 2, wherein the heterocyclic organic cations are selected from the group consisting of N-alkylpyrrolidinium, pyrrolidinium, 1-alkyl-3-methylimidazolium, N-alkylpyridinium, 2-alkyl-1-pyrrolinium, 1-alkylimidazolium and mixtures thereof.

4. The device of claim 1, wherein said complexing anions are selected from the group consisting of fluoride, chloride, bromide, iodide, cyanide and thiocyanate.

5. The device of claim 1, wherein said ionic liquid electrolyte further comprises dispersed carbon.

6. The device of claim 1, wherein said ionic liquid electrolyte further comprises a gelling agent.

7. The device of claim 6, wherein the gelling agent is a highly dispersed ceramic material.

8. The device of claim 7, wherein the highly dispersed ceramic material is silica or alumina.

9. The device of claim 6, wherein the gelling agent is an organic polymer.

10. The device of claim 1, wherein said ionic liquid electrolyte further comprises ions of a transition metal.

11. A reversible electrodeposition device for controlling the propagation of electromagnetic radiation, comprising:
    a first electrode which is substantially transparent to the radiation;
    a second electrode; and
    an ionic liquid electrolyte disposed between and in electrical contact with said first and second electrodes, said ionic liquid electrolyte comprising:
        ions of an electrodepositable metal selected from the group consisting of silver, copper, tin, zinc, palladium, bismuth, cadmium, mercury, indium, lead, antimony, thallium and alloys thereof,
        heterocyclic organic cations selected from the group consisting of N-methylpyrrolidinium, pyrrolidinium, 1-ethyl-3-methylimidazolium, 1-N-butylpyridinium, 2-methyl-1-pyrrolinium, 1-ethyl-midazolium and mixtures thereof, and
        complexing anions selected from the group consisting of chloride, bromide, iodide, cyanide and thiocyanate,
    such that a negative electrical potential applied to the first electrode relative to the second electrode tends to cause metal to be electrodeposited from the electrolyte onto the first electrode, and
    such that a positive electrical potential applied to the first electrode relative to the second electrode tends to cause deposited metal to be dissolved from the first electrode,
    wherein the amount of deposited metal subsisting on the first electrode affects the propagation of radiation by the device.

* * * * *